US006546767B1

(12) United States Patent
Kirejczyk et al.

(10) Patent No.: US 6,546,767 B1
(45) Date of Patent: Apr. 15, 2003

(54) VEHICLE DOOR LOCK WITH IMPROVED ANTI-THEFT FEATURES

(75) Inventors: Juliusz Kirejczyk, Richmond Hill (CA); Douglas G. Overbury, Holland Landing (CA); Krzysztof Groszkowski, Newmarket (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/744,713

(22) PCT Filed: Jul. 12, 1999

(86) PCT No.: PCT/CA99/00623

§ 371 (c)(1), (2), (4) Date: Jan. 29, 2001

(87) PCT Pub. No.: WO00/06859

PCT Pub. Date: Feb. 10, 2000

Related U.S. Application Data

(60) Provisional application No. 60/094,528, filed on Jul. 29, 1998.

(51) Int. Cl.[7] .......................... E05B 65/12; E05B 17/00; B60R 25/00

(52) U.S. Cl. ............................ 70/237; 70/417; 70/418; 292/346

(58) Field of Search ............................ 70/1.5, 1.7, 237, 70/264, 256, 417, 418; 292/DIG. 2, 346

(56) References Cited

U.S. PATENT DOCUMENTS 5,676,002 A * 10/1997 Hoeptner, III .............. 292/346
5,676,003 A * 10/1997 Ursel et al. ................. 292/201
5,715,713 A * 2/1998 Aubry et al. ............... 292/201
5,725,262 A * 3/1998 Kritzler ................... 292/336.3
5,752,346 A * 5/1998 Kritzler et al. ............... 49/502

* cited by examiner

*Primary Examiner*—Anthony Knight
*Assistant Examiner*—Michael J. Kyle
(74) *Attorney, Agent, or Firm*—Clark Hill PLC

(57) ABSTRACT

A vehicle door lock assembly has a latch (12) for mounting on a vehicle door. The latch (12) has at least one release lever for effecting releasing of the latch and at least one locking lever (14) for locking the latch, disabling the release lever, and unlocking the latch, enabling the release lever. A compound linkage (20, 24; 20, 124) operatively engages the locking lever (14). A lock cylinder (30, 130) has a spindle (28) which engages the linkage. The spindle (28) rotates in response to keyed rotation of a matched key being received by the lock cylinder (30; 130) which drives the linkage (20, 24; 20, 124) to effect movement of the locking lever (14). The spindle (28) is axially slidable to disengage the spindle from the linkage. A hollow shield (34) shrouds the locking lever (14), the linkage (20, 24; 20, 124) and the engagement between the linkage and the spindle (28), preventing access thereto. If the spindle is removed, the linkage will pivot away preventing manipulation thereof. The hollow shield (34) also separates the linkage (20, 24; 20, 124) from the lock cylinder opening further minimizing unauthorized manipulation of the locking lever.

8 Claims, 6 Drawing Sheets

VEHICLE DOOR LOCK WITH IMPROVED ANTI-THEFT FEATURES

This application claims priority to provisional No. 60/094,528, filed Jul. 29, 1998.

FIELD OF INVENTION

This invention relates to a vehicle door lock having improved anti-theft features. In particular, this invention relates to a vehicle door lock having a shield for protecting the lock from being unlocked by means other than a key and a drop-off linkage between the key cylinder and the connecting rod.

BACKGROUND OF THE INVENTION

Vehicle door latch systems are well known in the art. Typically, a vehicle door will have a latch for engaging and cinching onto a striker. The door will have an inside handle and an outside handle for releasing the latch and opening the door. Additionally, the door will have a lock for preventing the door from being opened by either the inside handle or the outside handle or both. For selected doors, the door is provided with a key cylinder for locking and unlocking the doors.

Optionally, vehicles can be provided with a power lock and unlock option. Each door latch is provided with an electric actuator for locking and unlocking the door latches. The actuators are electrically connected to a common station for effecting selected and ganged operation of the locks. The common station is now usually provided with a receiver which responds to a transmitter for remotely locking and unlocking the doors.

Additionally, rear doors are commonly provided with a lever for disabling the inside door handle for child proofing the vehicle.

Notwithstanding the ability to lock or disable the doors of the vehicle, the vehicle is still susceptible to theft by the use of a tool known as a "slim-jim". The "slim-jim" tool is inserted between the window and the window seal to manipulate the connecting rods between the locking lever or the release handle and the door latch. The "slim-jim" tool will either unlock or open the door allowing the thief access to the vehicle, usually in less than 30 seconds.

SUMMARY OF THE INVENTION

The disadvantages of the prior art may be overcome by providing a vehicle door latch with a shield extending between the latch and a key cylinder and providing a drop-off linkage between the key cylinder and the connecting rod such that the shield protects against direct manipulation and the drop-off linkage protects against key cylinder tampering.

According to one aspect of the invention, there is provided a vehicle door lock assembly which includes a latch for mounting on a vehicle door. The latch has at least one release lever for effecting releasing of the latch and at least one locking lever for locking the latch, disabling the release lever, and unlocking the latch, enabling the release lever. A compound linkage operatively engages the locking lever. A lock cylinder has a spindle which engages the linkage. The spindle rotates in response to keyed rotation of a matched key being received by the lock cylinder which drives the linkage to effect movement of the locking lever. The spindle is axially slidable to disengage the spindle from the linkage. A hollow shield shrouds the locking lever, linkage and the engagement between the linkage and the spindle, preventing access thereto. If the spindle is removed, the linkage will pivot away preventing manipulation thereof.

DESCRIPTION OF THE DRAWINGS

In drawings which illustrate an embodiment of the invention,

FIG. 6 is an end elevational view of a free rotation lock cylinder of the present invention, with key in;

DESCRIPTION OF THE INVENTION

Figure 1:
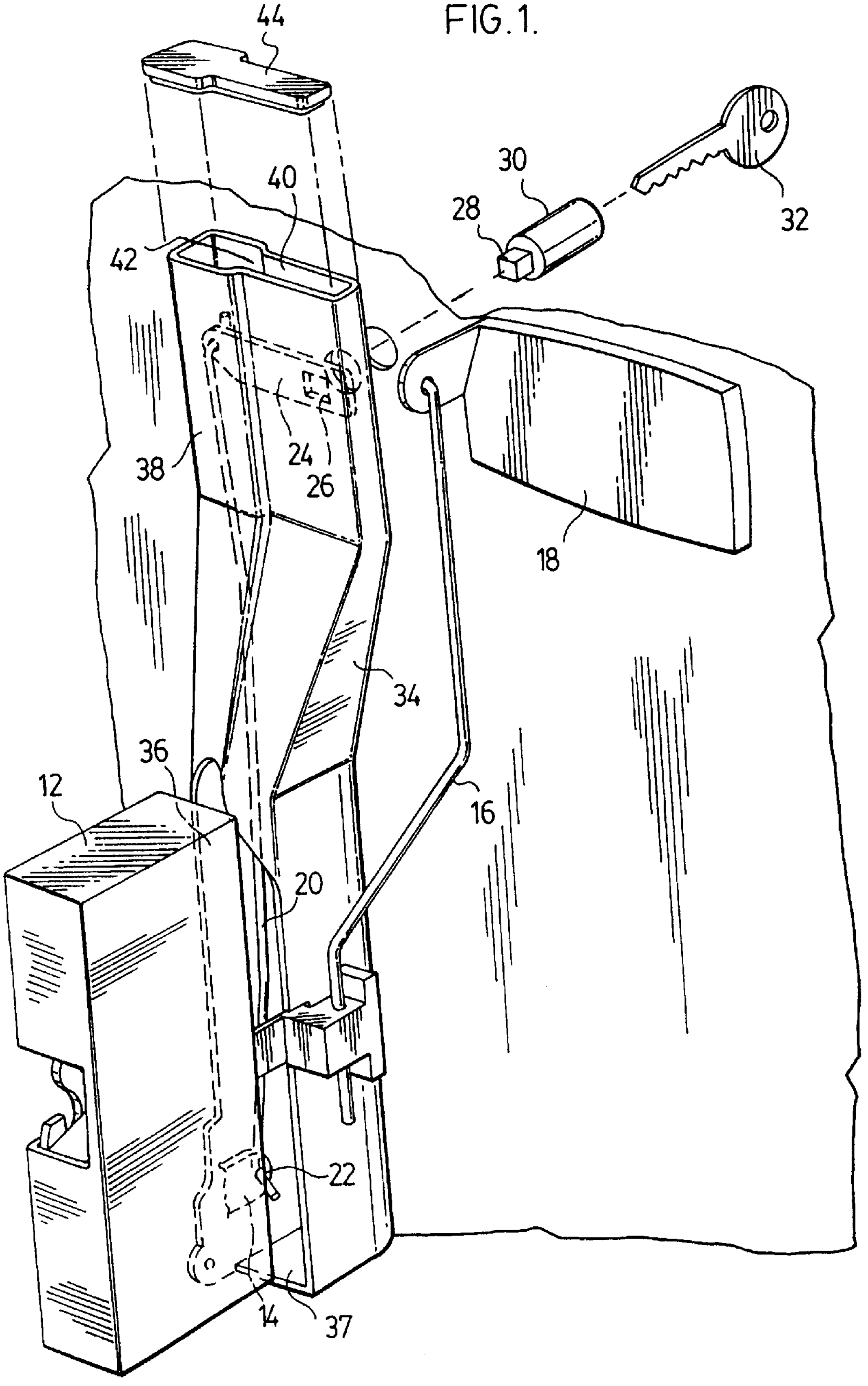
FIG. 1 is a perspective view of the vehicle door lock with improved anti-theft features of the present invention.
Figure 2:
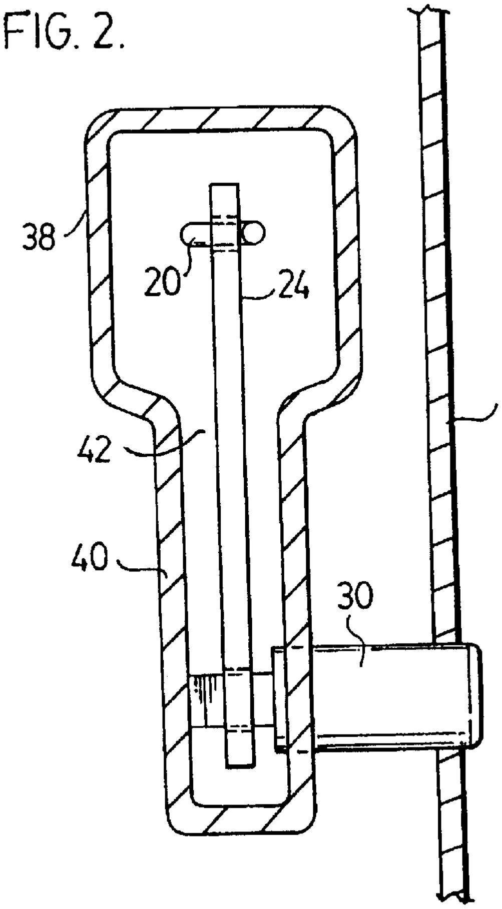
FIG. 2 is a top plan sectional view of the shield of FIG. 1.
Figure 3:
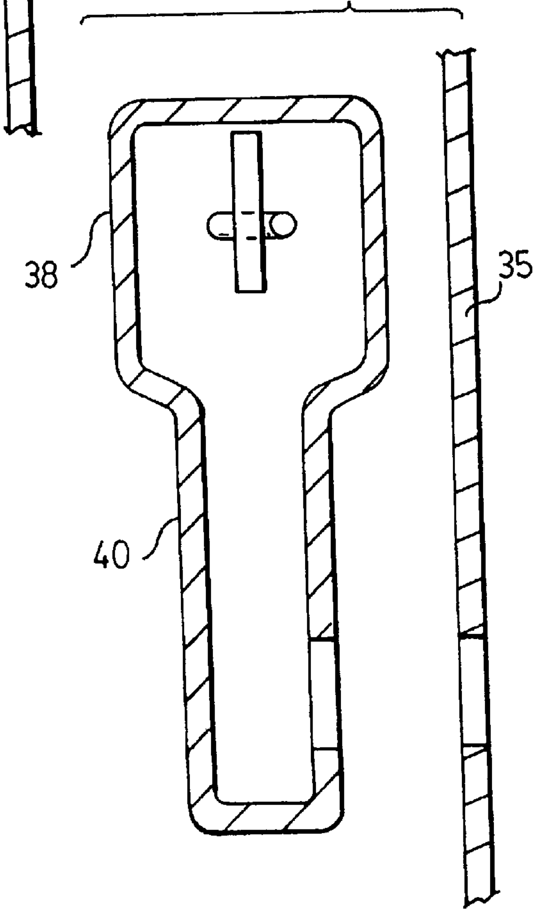
FIG. 3 is a top plan sectional view of the shield of FIG. 1 with the lock cylinder removed.
Figure 4:
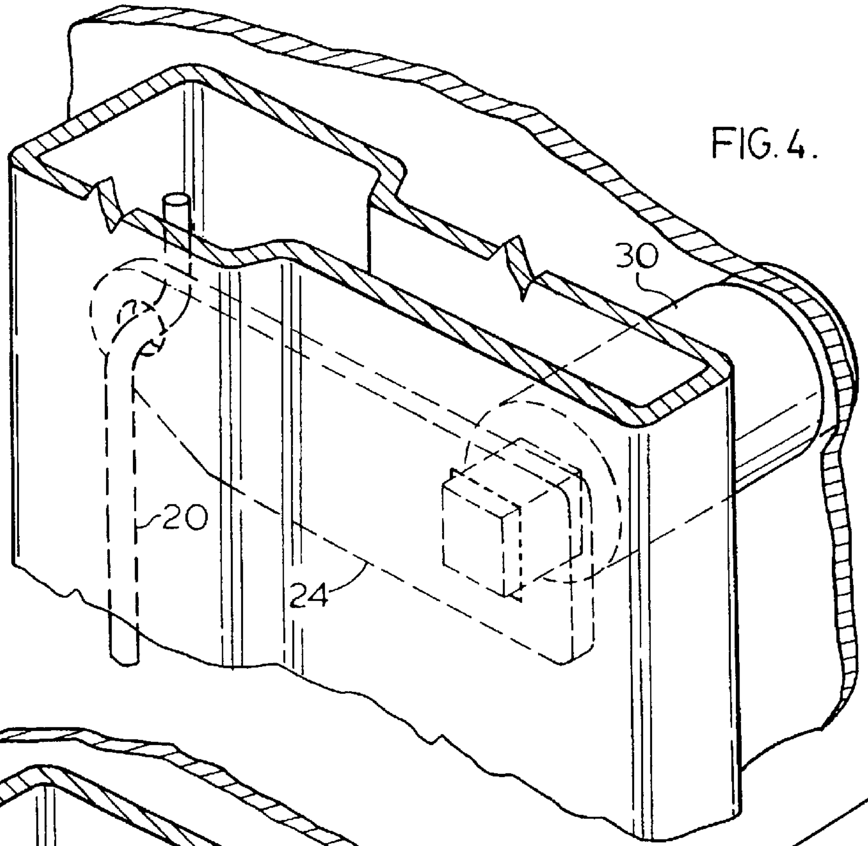
FIG. 4 is a perspective view of the upper end of the shield of FIG. 1.
Figure 5:
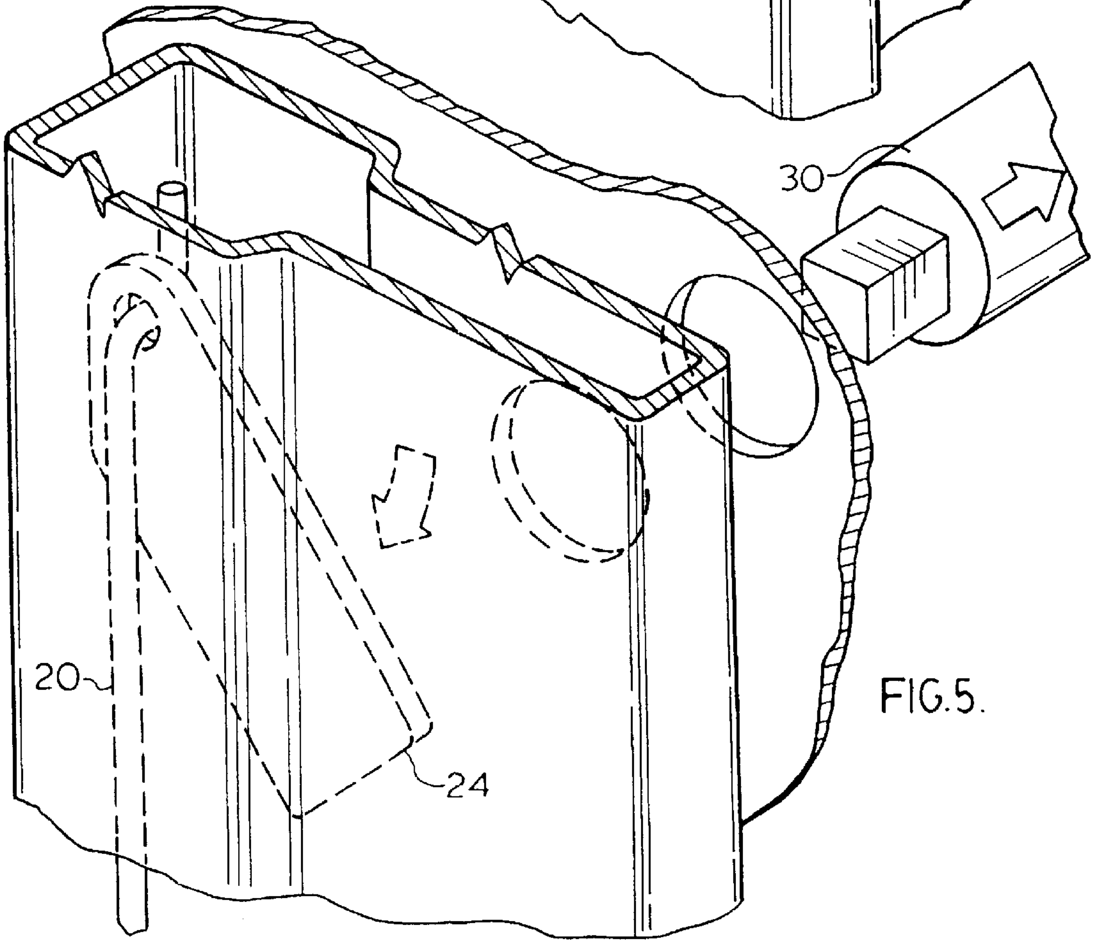
FIG. 5 is a perspective view of the upper end of the shield of FIG. 1 with lock cylinder removed.

Referring to the drawings, the door latch 12 incorporating the present invention is of conventional design and manufacture, commercially available on production vehicles. The door latch 12 has an outside locking lever 14 in addition to the usual levers (not illustrated) operably connected to an inside locking lever and inside door handle and outside door handle 18. Rod 16 connects the outside door handle 18 to the latch 12.

The outside locking lever 14 is pivotally connected to a compound linkage comprising a lock actuation rod 20 and drop-off link 24. Lever 14 has an aperture 22 for receiving the rod 16. Rod 16 extends upwardly to a door handle region of the vehicle door. The upper end of rod 16 is configured to pivotally receive drop-off link 24.

Drop off link 24 has an aperture 26 at one end for receiving a spindle 28 of the lock cylinder 30. Aperture 26 is sized and configured to rotate with the spindle 28. In the illustrated embodiment, the end of spindle 28 is square and aperture 26 is also square. It is readily understood that other complementary shapes, including rectangles, splines or other polygons may also be used to provide a driving engagement. Once the key cylinder is installed, the end of spindle 24 provides a driving engagement for effecting the locking and unlocking of the latch 12.

Figure 6:
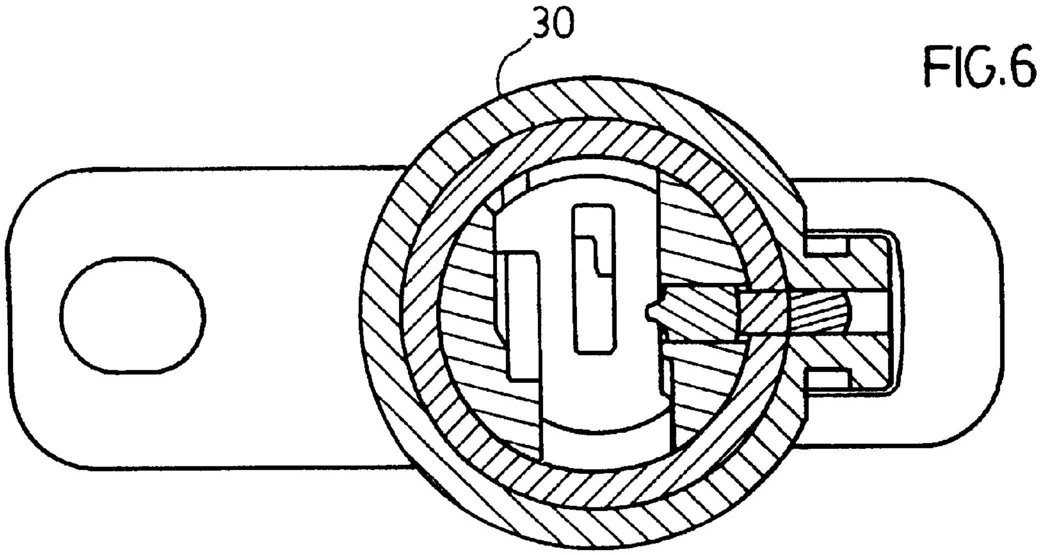
Figure 7:
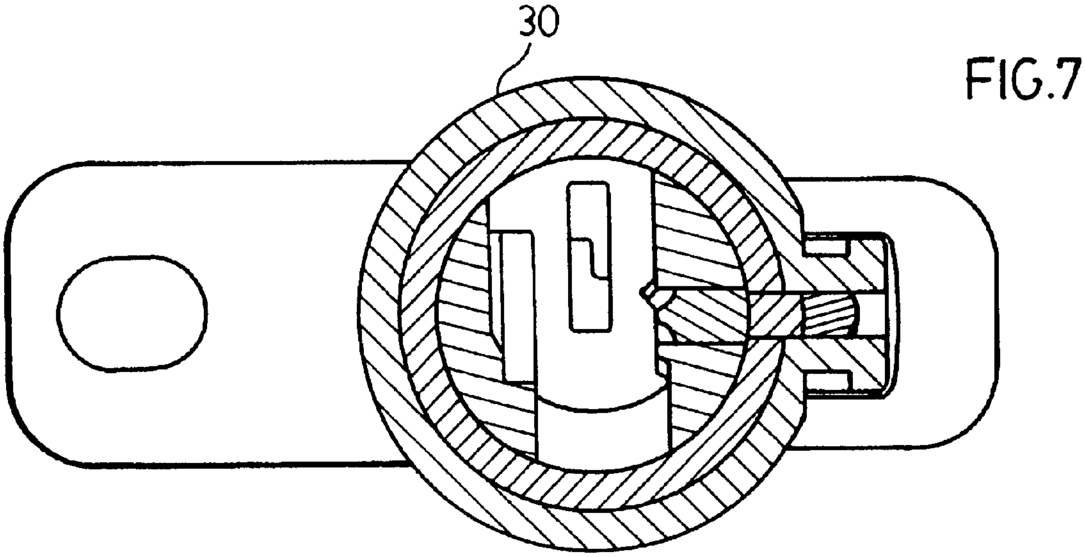
FIG. 7 is an end elevational view of a free rotation lock cylinder of the present invention, with key out.

The lock cylinder 30 is preferably of the type as illustrated in FIGS. 6 and 7 which will freely rotate until a matched key 32 is inserted to properly align the tumblers to provide a driving connection. However, other conventional key cylinders may also be used.

A hollow shield 34 extends from the door latch 12 to the key cylinder 30. Hollow shield 34 has an longitudinal slot 36 for receiving a side edge of the latch 12 such that locking lever 14 is fully shrouded by the hollow shield 34. The hollow shield 34 has a first chamber 38 which merges upwardly to a rectangular cross section and communicates with a second chamber 40 through an access port 42. In the preferred embodiment, the cross section of the second chamber 40 is substantially narrower than the first chamber 38.

Preferably, shield 34 is a hydroformed part. Alternatively, the shield 34 can be manufactured using other conventional techniques using two halves and then joining the halves together.

The access port 42 preferably has a width slightly greater than the thickness of the drop-off link 24 and less than the width of the upper end of the rod 20 which is configured to pivotally receive the link 24. The access port 42 thus allows the link 24 to pivot and prevents the rod 20 from entering the second chamber 40.

A bracket wraps about the shield 34 to secure the shield 34 to the inside of the door adjacent a door panel 35. The lower end of the shield 34 is secured directly to the latch 12. Depending on the design of the latch, suitable slots are provided in the shield 34 such that other actuating levers for door handles and inside door locks can extend therethrough. An end cap 44 closes the upper end of the shield 34 in a frictional fit. Shield 34 has a formed end 37 to close the lower end of the shield.

In operation, the shield 34 fully protects the rod 20 from being manipulated directly by a "slim-jim" as all operational parts of the locking mechanism are internal to the shield 34. If a thief forcefully removes the lock cylinder 30, the end of spindle 28 will be retracted, releasing the drop-off link 24. The drop-off link 24 will pivot downwardly from the end of rod 20. The minimal width of the second chamber 40 at the upper end of the shield 34 minimizes the ability of the thief to reach through the key aperture to grab and manipulate the rod 20 or the drop-off link 24. Additionally, the length of the rod 20 could be reduced with an attendant increase in length of the drop-off link 24. The decreased rod length will result in the spindle connecting end of the drop-off link 24 to pivot away, further reducing the likelihood that the thief could reach through the key aperture to grab and manipulate the rod 20 or the drop-off link 24.

In trials using the present invention, a professional security expert was unable to break into the vehicle in under 30 minutes. It is accepted that if a thief takes longer than 30 seconds to break into a vehicle, the thief would likely move onto another vehicle.

Figure 8:
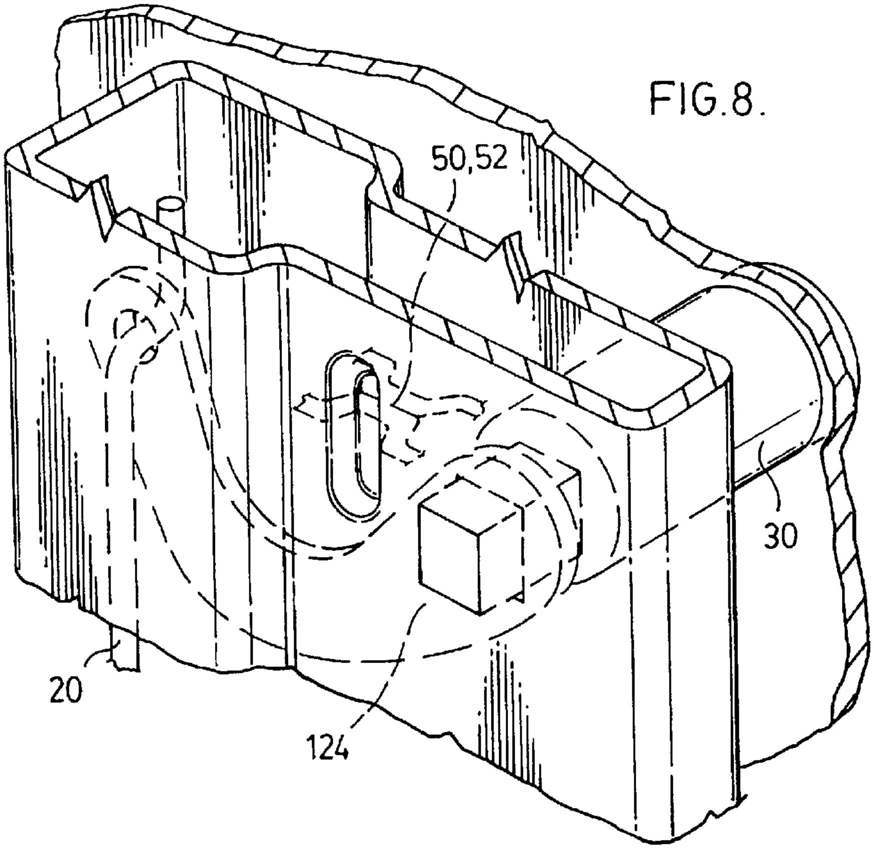
FIG. 8 is a partial perspective view of a second embodiment of a vehicle door lock with improved anti-theft features of the present invention.
Figure 9:
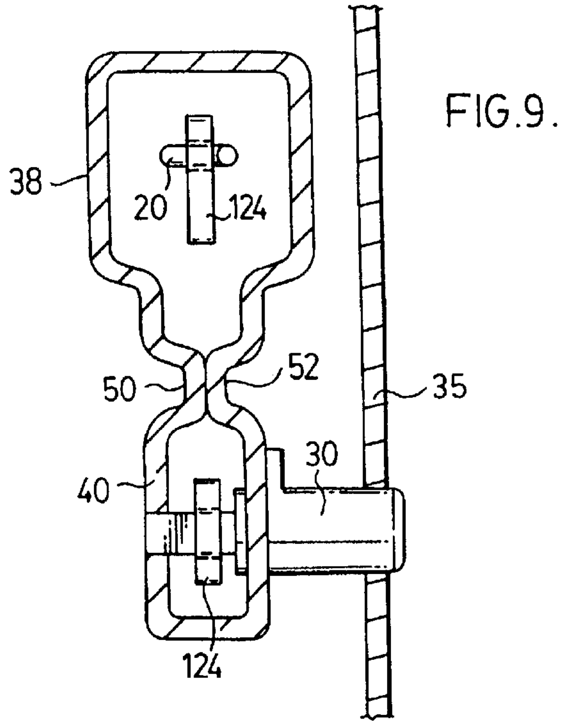
FIG. 9 is a sectional top plan view of the shield of FIG. 8.

Referring now to FIGS. 8 and 9, a second embodiment of the present invention is illustrated. The second embodiment is further provided with an arcuate drop-off link 124. The access port 42 of the shield 34 is defined in part by embossments 50, 52 extending inwardly from opposite sides of the narrowed section 40. The embossments 50, 52 close the gap intermediate the lock cylinder 30 and the rod 20 in the first chamber 38 of the shield 34. The drop-off link extends arcuately under the embossments 50, 52. The embossments 50, 52 creates another barrier for a would-be thief.

Figure 10:
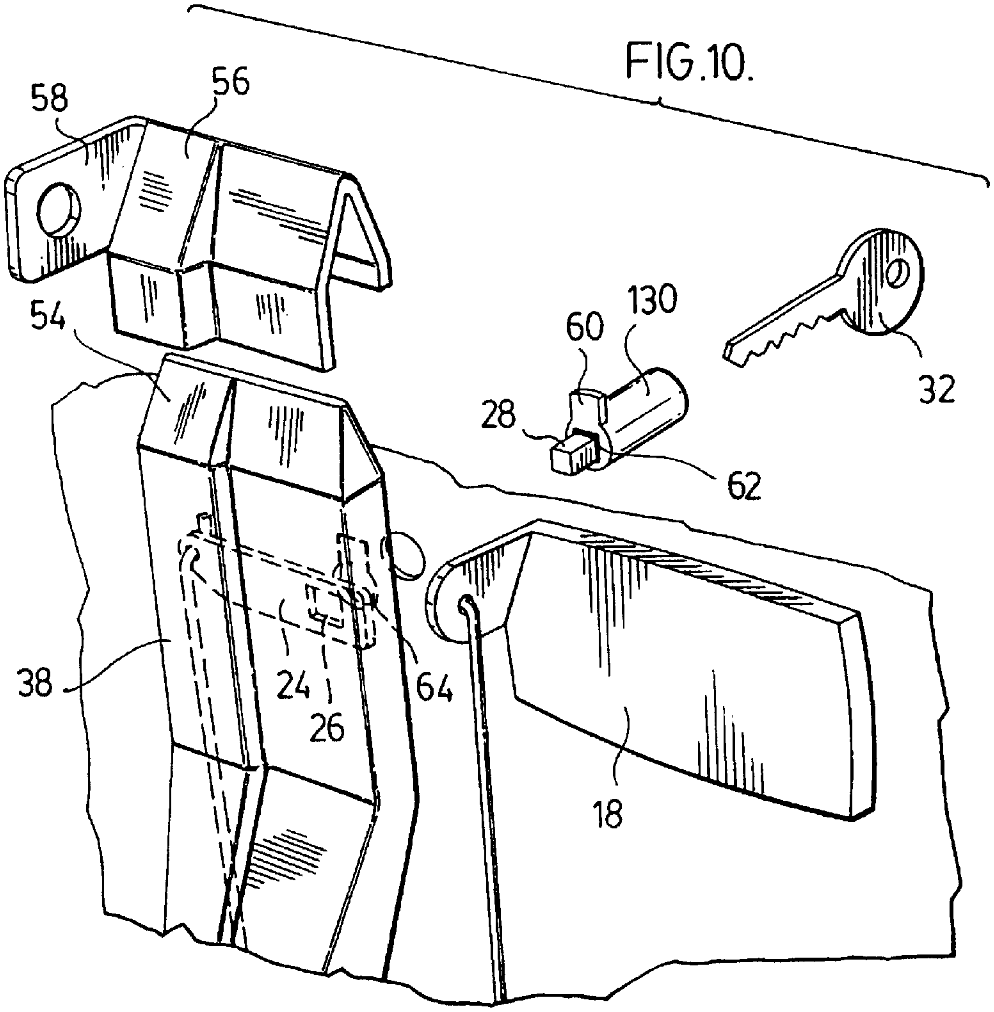
FIG. 10 is a partial perspective view of a third embodiment of a vehicle door lock with improved anti-theft features of the present invention.
Figure 11:
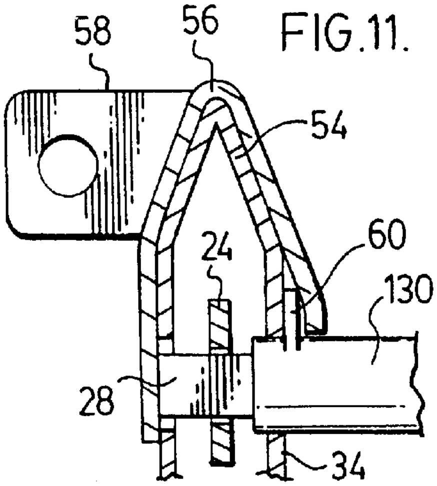
FIG. 11 is a side sectional view of the shield of FIG. 10.

Referring now to FIGS. 10 and 11, another embodiment of the present invention is illustrated. In this embodiment, the upper end 54 of the shield 34 is closed, preferably by some mechanical means to form a prismatic shape. A complementary fitting bracket 56 covers the upper end 54. Flange 58 has an aperture for receiving a fastener to attach the bracket 56 and shield 34 to the door frame. Key cylinder 130 has a flange 60 at the inboard end thereof. The flange 60 is sandwiched between the bracket 56 and the shield 34 after installation. Bracket 56 functions to support the shield 34 and also to retain the key cylinder 130 to the shield 34, as well as cover the end of spindle 28 on the inboard side.

The inboard end of key cylinder 130 has a non-circular shoulder 62 which fits into a complementary non-circular aperture 64 in the outboard wall of narrow section 40. The shoulder 62 and aperture 64 prevents rotation of the key cylinder 130, in the event of a rotation without a key using a tool such as a screwdriver.

Bracket 56 adds protection against penetration to the upper end 54. The prismatic shape of upper end 54 makes it difficult to drill into the top of the shield 34.

The above-described embodiments of the invention are intended to be examples of the present invention and alterations and modifications may be effected thereto, by those of skill in the art, without departing from the scope of the invention.

We claim:

1. A vehicle door lock assembly comprising:

a latch (12) for mounting one a vehicle door, said latch having at least one release lever for effecting releasing of said latch and at least one locking lever (14) for locking the latch, disabling said release lever, and unlocking the latch, enabling said release lever, a compound linkage (20, 24) operatively engaging said locking lever (14), a lock cylinder (30) having a spindle (28) engaging said compound linkage, said spindle being rotatable in response to keyed rotation of a matched key received by said lock cylinder to drive said compound linkage to effect movement of said locking lever (14), and axially slidable to disengage said spindle from said linkage, and a hollow shield (34) shrouding said at least one locking lever (14), said compound linkage and said engagement between said compound linkage and said spindle, preventing access thereto, characterized by said compound linkage comprising a link (24) and a rod (20) pivotally connected thereto, said link (24) engaging said spindle (28), said link (24) pivots away from said spindle (28) to be spaced therefrom when said lock cylinder (30) is retracted from said assembly, wherein said hollow shield (34) separates said rod (20) from said lock cylinder (30) and has a first chamber (38) communicating with a second chamber (40) through an access port (42), said first chamber (38) housing said rod (20) and said link (24) extends through said access port (42) from said first chamber (38) to said second chamber (40), said access port (42) sized to permit said pivotal movement of said link (24) and to prevent said rod (20) from entering said second chamber (40).

2. An assembly as claimed in claim 1 wherein said hollow shield (34) has an opening at one end configured to receive and enclose a portion of the latch (12) from which said locking lever (14) extends, and has an aperture at an opposite end region for receiving said lock cylinder (30).

3. An assembly as claimed in claim 2 wherein said lock cylinder (30) is fixedly retained to said hollow shield (34) substantially preventing forced rotation thereof.

4. An assembly as claimed in claim 3 wherein said access port (42) is defined by embossments extending inwardly from opposite sides of said hollow shield (34).

5. An assembly as claimed in claim 4 wherein said hollow shield (34) is closed at an end opposite said one end.

6. An assembly as claimed in claim 4 wherein said hollow shield (34) is open at an end opposite said one end and said assembly further comprises a cap (44) closing said open end.

7. An assembly as claimed in claim 5, wherein said closed end is a prismatic shape and a bracket (56) complimentary to the prismatic shape positions said shield (34).

8. An assembly as claimed in claim 6 wherein said link (24) is arcuate.

* * * * *

UNITED STATES PATENT AND TRADEMARK OFFICE

CERTIFICATE OF CORRECTION

PATENT NO. : 6,546,767 B1

DATED : April 15, 2003

INVENTOR(S) : Kirejczyk et al.

It is certified that error appears in the above-identified patent and that said Letters Patent is hereby corrected as shown below:

Column 2,
Line 53, add -- 30 -- after “Key cylinder”.

Column 4,
Line 14, “one” should be -- on --.
Line 64, “6” should be -- 5 --.

Signed and Sealed this

Twenty-sixth Day of August, 2003

JAMES E. ROGAN
*Director of the United States Patent and Trademark Office*